United States Patent
Lee

(10) Patent No.: US 12,381,749 B2
(45) Date of Patent: Aug. 5, 2025

(54) METHOD AND APPARATUS FOR REDUCING ORPHAN BLOCKS FOR A BLOCKCHAIN

(71) Applicant: LG ELECTRONICS INC., Seoul (KR)

(72) Inventor: Ki-Dong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 245 days.

(21) Appl. No.: 18/041,287

(22) PCT Filed: Aug. 10, 2021

(86) PCT No.: PCT/KR2021/010567
§ 371 (c)(1),
(2) Date: Feb. 10, 2023

(87) PCT Pub. No.: WO2022/035178
PCT Pub. Date: Feb. 17, 2022

(65) Prior Publication Data
US 2023/0327894 A1    Oct. 12, 2023

Related U.S. Application Data

(60) Provisional application No. 63/065,514, filed on Aug. 14, 2020.

(51) Int. Cl.
*H04L 29/00* (2006.01)
*H04L 9/00* (2022.01)
*H04W 12/00* (2021.01)

(52) U.S. Cl.
CPC ............ *H04L 9/50* (2022.05); *H04W 12/009* (2019.01)

(58) Field of Classification Search
CPC .... H04L 9/50; H04L 2209/80; H04W 12/009; H04W 12/10
See application file for complete search history.

(56) References Cited

U.S. PATENT DOCUMENTS

| 10,445,643 | B2 | 10/2019 | Katz et al. |
| 10,579,974 | B1 * | 3/2020 | Reed .................. G06Q 20/065 |
| 10,630,463 | B2 * | 4/2020 | Mankovskii .......... H04L 9/3239 |

(Continued)

FOREIGN PATENT DOCUMENTS

| KR | 10-2020-0070776 | 6/2020 |
| KR | 10-2020-0095204 | 8/2020 |

(Continued)

OTHER PUBLICATIONS

PCT International Application No. PCT/KR2021/010567, International Search Report dated Nov. 24, 2021, 2 page.

*Primary Examiner* — Don G Zhao
(74) *Attorney, Agent, or Firm* — LEE, HONG, DEGERMAN, KANG & WAIMEY

(57) ABSTRACT

A method and apparatus for reducing orphan blocks for a blockchain is provided. The second wireless device obtains information on a first block generated by a first wireless device. The second wireless device initiates to generate a second block based on the information. The second wireless device generates an indication informing that a generation of the second block is initiated. The second wireless device shares the generated indication among participants of the blockchain.

14 Claims, 18 Drawing Sheets

(56) References Cited

U.S. PATENT DOCUMENTS

| | | | |
|---|---|---|---|
| 11,310,719 B1* | 4/2022 | Boschulte | H04W 40/248 |
| 2016/0342977 A1 | 11/2016 | Lam | |
| 2016/0358253 A1 | 12/2016 | Liao et al. | |
| 2019/0164157 A1* | 5/2019 | Balaraman | G06Q 20/36 |
| 2019/0268138 A1* | 8/2019 | Mankovskii | G06Q 20/065 |
| 2019/0303920 A1* | 10/2019 | Balaraman | H04L 67/1042 |
| 2019/0303942 A1* | 10/2019 | Balaraman | H04L 9/3239 |
| 2019/0379546 A1* | 12/2019 | Chang | G06Q 20/4016 |
| 2019/0386969 A1* | 12/2019 | Verzun | G06F 21/606 |
| 2020/0027096 A1* | 1/2020 | Cooner | G06Q 40/04 |
| 2020/0058019 A1* | 2/2020 | Navin | G06Q 30/0201 |
| 2020/0076827 A1* | 3/2020 | Gluck | H04L 9/50 |
| 2020/0084027 A1* | 3/2020 | Duchon | G06F 21/602 |
| 2020/0134719 A1* | 4/2020 | Malik | G06Q 20/3674 |
| 2020/0210451 A1* | 7/2020 | Wang | G06Q 20/02 |
| 2020/0244463 A1* | 7/2020 | Wilson | H04L 9/3239 |
| 2020/0322041 A1* | 10/2020 | Chao | H04W 4/44 |
| 2020/0372154 A1* | 11/2020 | Bacher | H04L 63/1408 |
| 2021/0019429 A1* | 1/2021 | Cooner | G01J 1/4204 |
| 2021/0110047 A1* | 4/2021 | Fang | G06N 20/00 |
| 2021/0217001 A1* | 7/2021 | Harrison | G06F 21/6218 |
| 2022/0180374 A1* | 6/2022 | Cooner | G06Q 20/145 |
| 2023/0327894 A1* | 10/2023 | Lee | H04W 12/10 380/270 |
| 2024/0291677 A1* | 8/2024 | Ito | H04L 9/50 |

FOREIGN PATENT DOCUMENTS

| | | |
|---|---|---|
| WO | 2016-154140 | 9/2016 |
| WO | 2019-034969 | 2/2019 |

* cited by examiner

FIG. 18

```
===Service Robot Task Record===
```

| | |
|---|---|
| data : Genesis Block/ZenithConnectedRobots<br>nonce : 0<br>prev : 0<br>hash : 57ebfa69e31520a6c8123b5a4ec550ccad1b297676b8fb66c983637785<br>next : 00000bd803c23f62024d896086d9291550aa99dcdae28b127ca3e3e18896769 | Genesis Block |
| data : {' SOBOT A - work code =' : 1}<br>nonce : 784623<br>prev : 57ebfa69e31520a6c8123b5a4ec550ccad1b297676b8fb66c983637785<br>hash : 00000bd803c23f62024d896086d9291550aa99dcdae28b127ca3e3e18896769<br>next : 000003a4cca8f5e20a0bc7719d1555b9d61fe0c06ba6ed911b0acb25b07e509c | Block A |
| data : {' SOBOT B - work code =' : 1}<br>nonce : 807383<br>prev : 00000bd803c23f62024d896086d9291550aa99dcdae28b127ca3e3e18896769<br>hash : 000003a4cca8f5e20a0bc7719d1555b9d61fe0c06ba6ed911b0acb25b07e509c<br>next : 0000015a5f469c0ef734b346a955f420592c702dd831b6e2cdc8bac56b94e582 | First Block |
| data : {' SOBOT A - work code =' : 10}<br>nonce : 297839<br>prev : 000003a4cca8f5e20a0bc7719d1555b9d61fe0c06ba6ed911b0acb25b07e509c<br>hash : 0000015a5f469c0ef734b346a955f420592c702dd831b6e2cdc8bac56b94e582<br>next : | Second Block |
| data : {' SOBOT B - work code =' : 10}<br>nonce : 5957<br>prev : 000003a4cca8f5e20a0bc7719d1555b9d61fe0c06ba6ed911b0acb25b07e509c<br>hash : 00000ac51b2e80f354bb4486fa519c6af28291de19b2d8a24a6f2bb51e119e68<br>next : | Third Block |

METHOD AND APPARATUS FOR REDUCING ORPHAN BLOCKS FOR A BLOCKCHAIN

CROSS-REFERENCE TO RELATED APPLICATION(S)

This application is the National Stage filing under 35 U.S.C. 371 of International Application No. PCT/KR2021/010567, filed on Aug. 10, 2021, which claims the benefit of U.S. Provisional Application No. 63/065,514, filed on Aug. 14, 2020, the contents of which are all hereby incorporated by reference herein in their entireties.

TECHNICAL FIELD

The present disclosure relates to a method and apparatus for reducing orphan blocks for a blockchain.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Blockchain is a distributed ledger technology that provides a way to record and share information and value between participants of a network. Within this network, each member gets a copy of the ledger, and members validate updates collectively. The information could represent contracts, identities, transactions, and any assets that can be represented digitally. Blockchain entries are permanent, transparent, and traceable, which makes it possible for participants to view transaction historical data with a guarantee that the entries are valid and have not been modified. The distributed ledger takes the form of a series of linked blocks of data, hence the name blockchain.

SUMMARY

The blockchain technology may be used for communication system. For example, a blockchain may be used for improving business process, reducing costs, and enabling new business opportunity. For example, a blockchain may be used for sharing economy between consumers and providers. For example, a blockchain may be utilized for supplying Chain Management and/or Self-Sovereign Identity (for example, bridge the gap between real identities and digital identities). For example, a blockchain may be utilized for content distribution to remove intermediaries from the process (for example, directly from content provider straight to Communications Service Provider (CSP) customer devices). For example, a blockchain may be used for Crypto-wallet. For example, a blockchain may be used to spin Distributed Ledger Technology (DLT) (for example, traceability aspect).

Meanwhile, in a blockchain technology (for example, for connected robotics applications), at least two miners could generate blocks at similar times. Then, only one block generated by one miner could be logically attached to a blockchain. The meaning of "logically attached" is that a block, say block A2, that claims a second block, say block A1, to be its previous block (namely, A2 is claiming that A2's previous block is A1) in the blockchain gains the consensus among blockchain participants that the claim is true and block A2 is accommodated into the blockchain as a new block. The other blocks generated by other miners may not be attached to the blockchain and become an orphan block. Many algorithms to reuse the orphan blocks have been studied. However, a lot of resources (for example, computing power and time) are required for handling the orphan blocks.

Therefore, studies for reducing orphan blocks for a blockchain are needed.

In an aspect, a method performed by a second wireless device in a wireless communication system is provided. The second wireless device obtains information on a first block generated by a first wireless device. The second wireless device initiates to generate a second block based on the information. The second wireless device generates an indication informing that a generation of the second block is initiated. The second wireless device shares the generated indication among participants of the blockchain.

In another aspect, an apparatus for implementing the above method is provided.

The present disclosure may have various advantageous effects.

According to some embodiments of the present disclosure, a device (for example, a wireless device) could efficiently reduce a number of orphan blocks for a blockchain.

For example, a device could efficiently reduce the orphan blocks by increasing batch size in a specific situation.

For example, a device could efficiently reduce the orphan blocks by informing other devices that a generation of a subsequent block for a block chain is initiated.

According to some embodiments of the present disclosure, a communication system could efficiently reduce a number of orphan blocks for a blockchain.

For example, a communication system could efficiently reduce the orphan blocks by controlling batch size to be generated.

Therefore, for use case scenarios that require real-time and/or semi-real-time information sharing (for example, work log and/or work status information sharing of service robots), it is possible to reduce the rate of orphan block generation, which is an inevitable obstacle, and reduce delay.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

BRIEF DESCRIPTION OF THE DRAWINGS

FIGS. 17 and 18 show an example of a method for reducing orphan blocks for a blockchain using a hyper-layer, according to some embodiments of the present disclosure.

DETAILED DESCRIPTION

Figure 1:
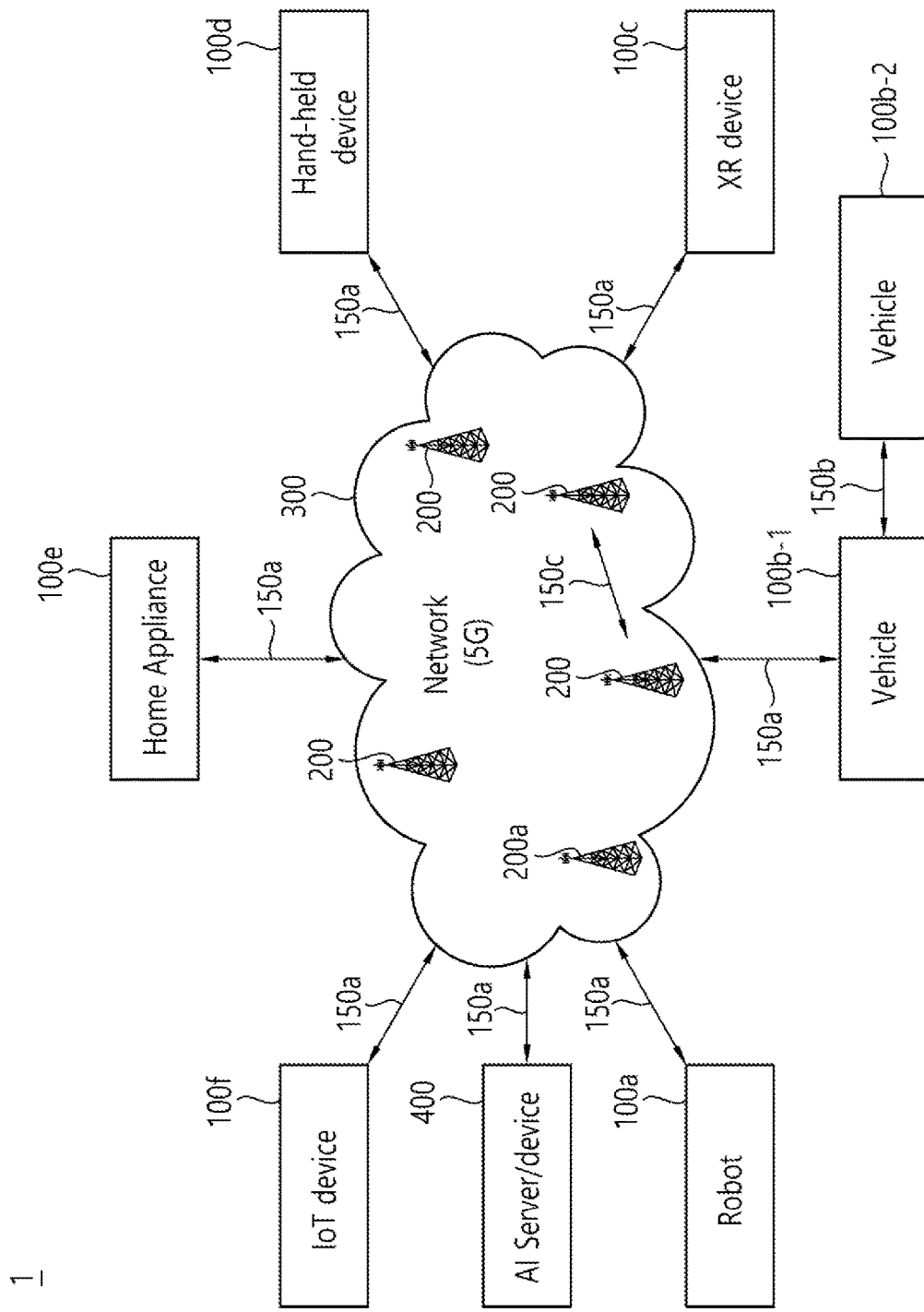
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 31 billions by 2025. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driving vehicles and between a vehicle and infrastructure. In the future, a self-driving vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
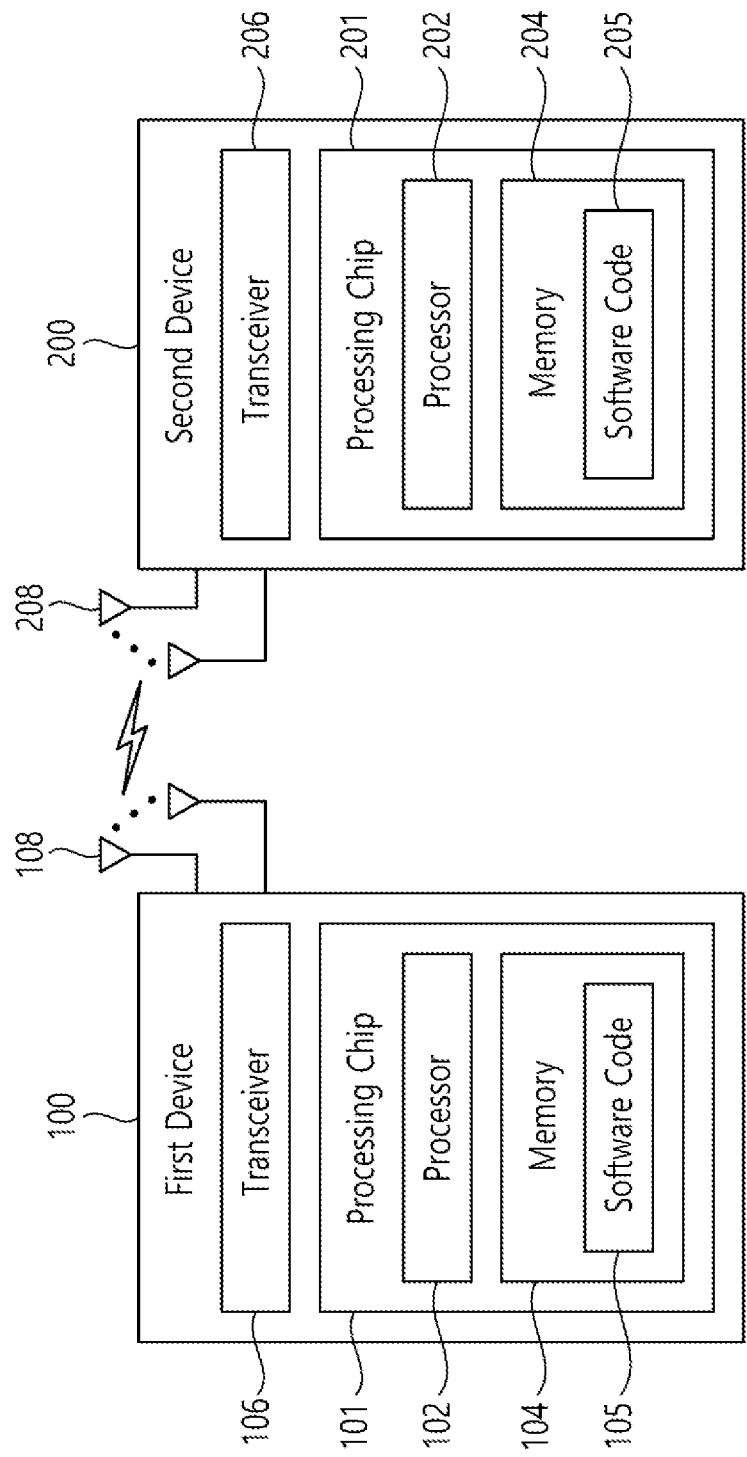
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals)

from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
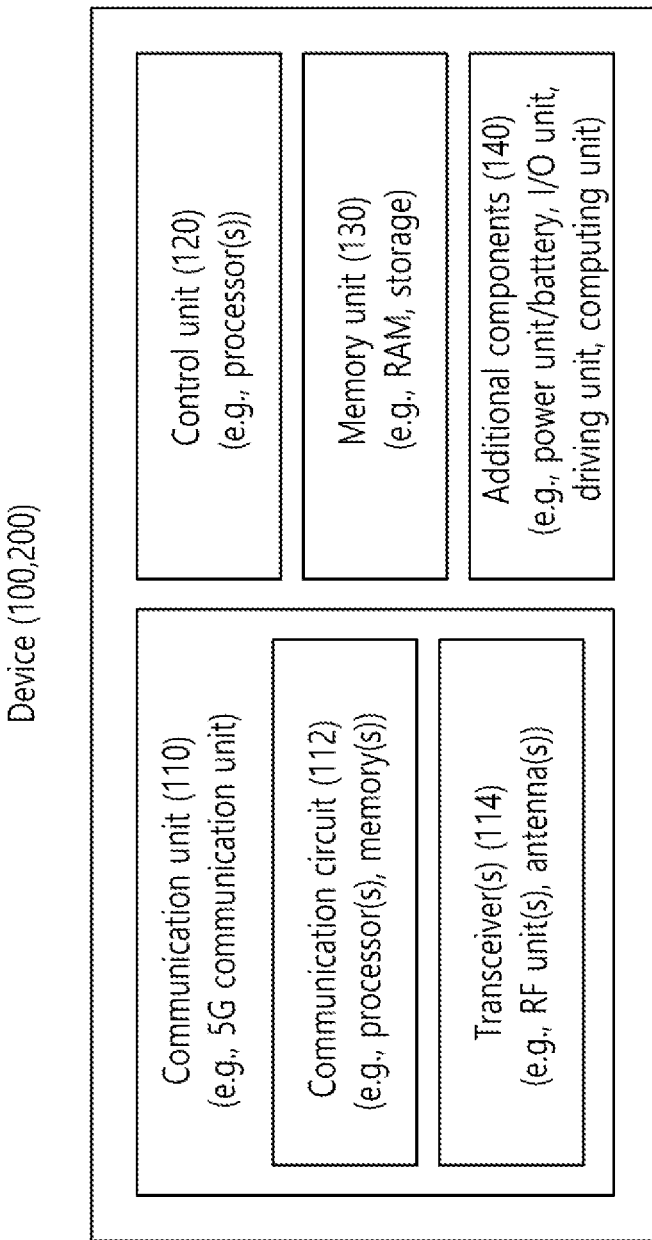
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
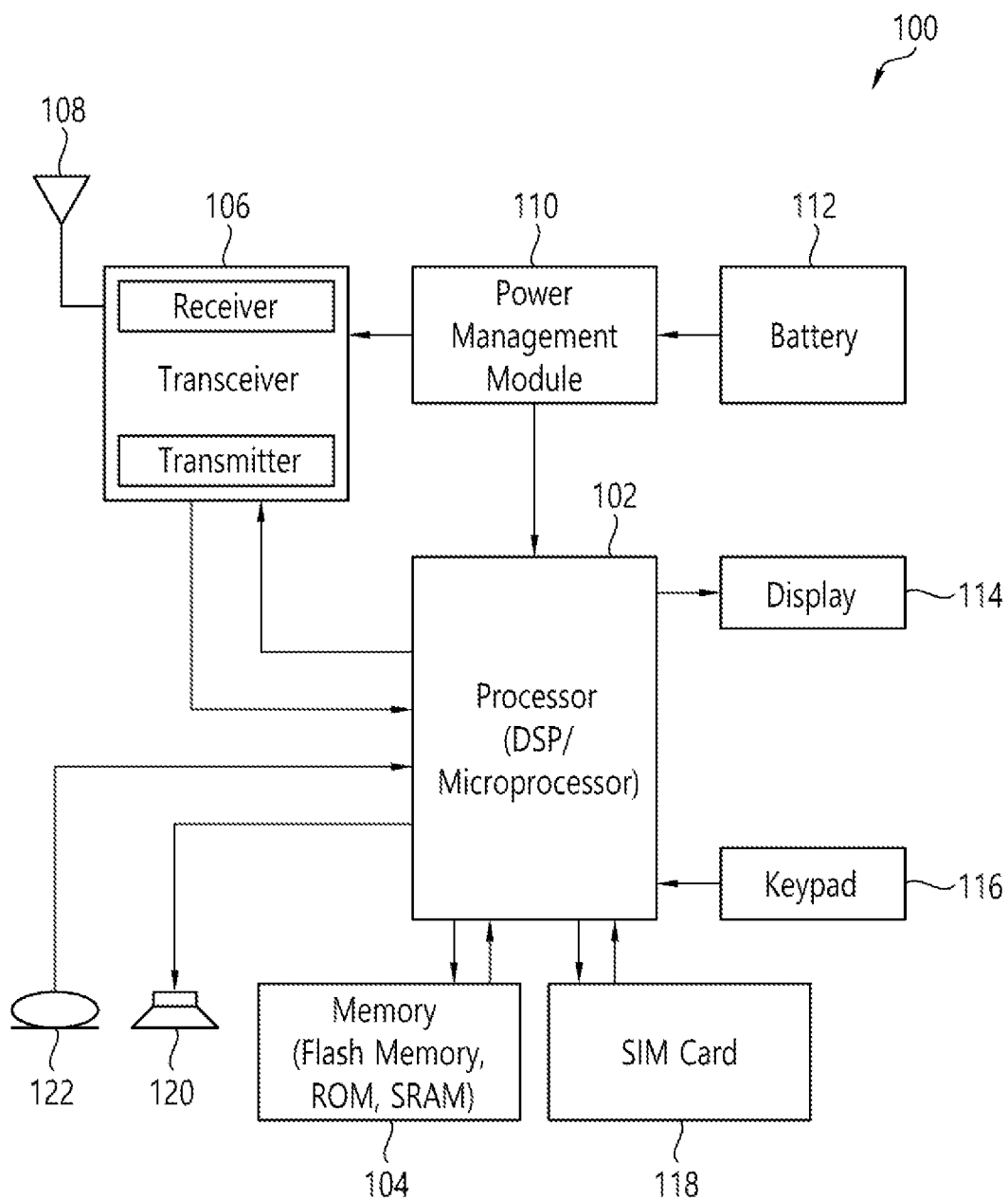
FIG. 4 shows an example of UE to which implementations of the present disclosure is applied.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 5:
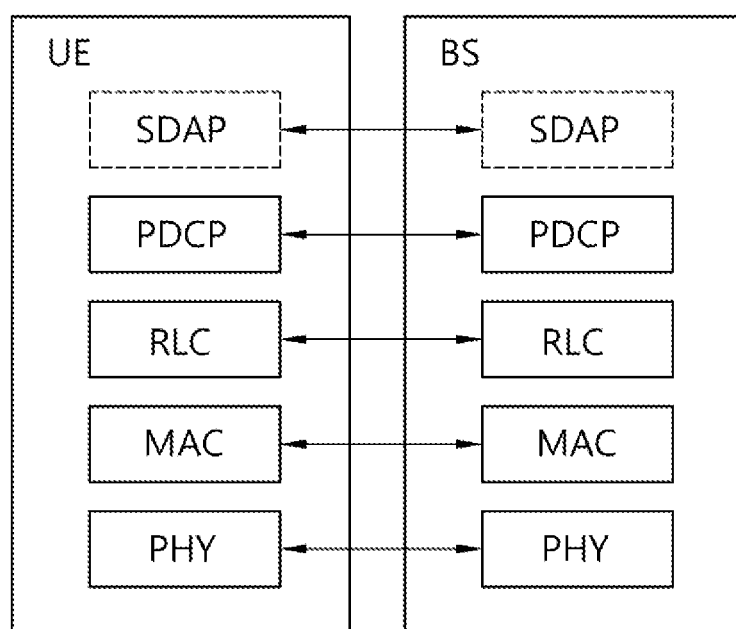
FIGS. 5 and 6 show an example of protocol stacks in a 3GPP based wireless communication system to which implementations of the present disclosure is applied.
Figure 6:
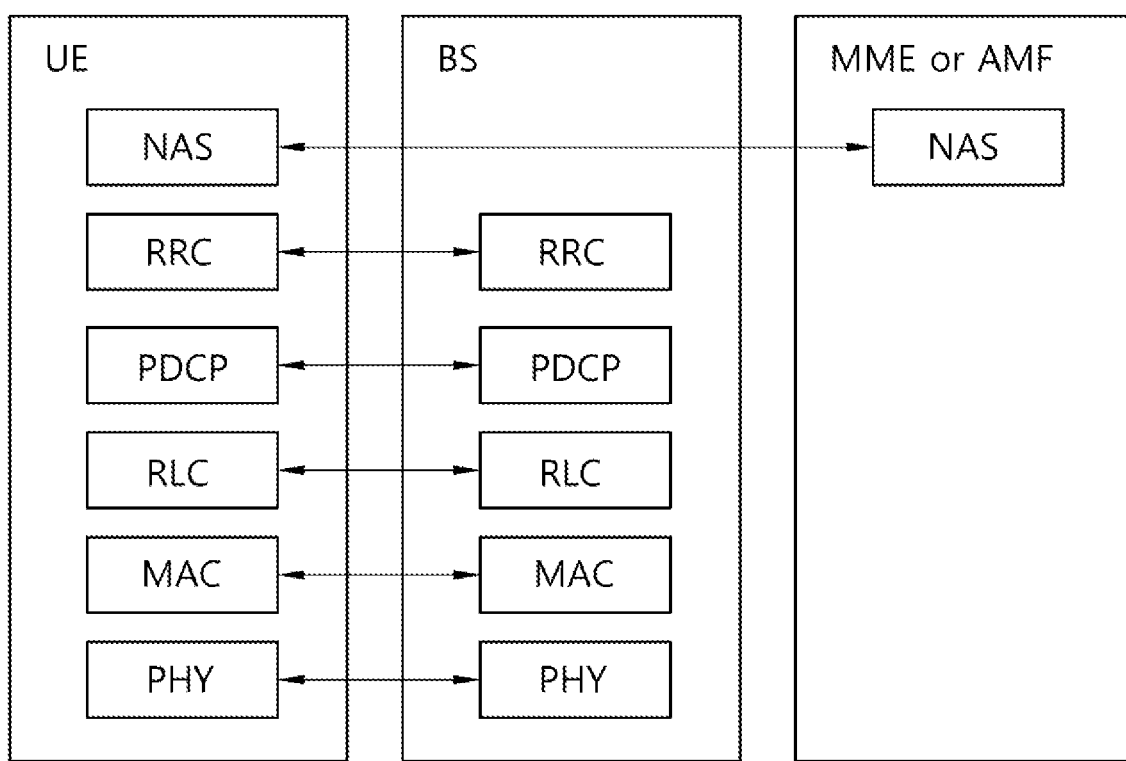

FIGS. 5 and 6 show an example of protocol stacks in a 3GPP based wireless communication system to which implementations of the present disclosure is applied.

In particular, FIG. 5 illustrates an example of a radio interface user plane protocol stack between a UE and a BS and FIG. 6 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 5, the user plane protocol stack may be divided into Layer 1 (i.e., a PHY layer) and Layer 2. Referring to FIG. 6, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

The blockchain technology may be used for mobile industry. For example, a blockchain may be used for improving business process, reducing costs, and enabling new business opportunity. For example, a blockchain may be used for opportunities arising in a sharing economy between prosumer, which means consumer and provider. For example, a blockchain may be utilized for supplying Chain Management and/or Self-Sovereign Identity, for example, bridging the gap between real identities and digital identities. For example, a blockchain may be utilized for content distribution to remove intermediaries from the process, for example, proving the contents directly from content provider straight to Communications Service Provider (CSP) customer devices. For example, a blockchain may be used for Crypto-wallet. For example, a blockchain may be used for smart city and/or ads. For example, a blockchain may be used to spin Distributed Ledger Technology (DLT) (for example, traceability aspect) off from SLIM.

Meanwhile, in a blockchain technology (for example, for connected robotics applications), at least two miners could generate blocks at similar times. Then, only one block generated by one miner could be logically attached to a blockchain. The other blocks generated by other miners may not attached to the blockchain and become orphan blocks.

For example, if two miners generate blocks at similar times, only one would and could be accommodated as the subsequent block of the latest block (last block) attached to the chain in consensus.

In other words, since the only one block that is accepted by the chain is to be added to the chain, whereas the other blocks, if any, are not ultimately accepted by the chain although each of them is valid transaction. The other blocks are considered orphan blocks. Herein, the valid transaction may imply that a previous block is correct and/or the transaction is correct (or true).

There are some scenarios related to orphan blocks. For example, in multi-robot service operations, two Service Robots could generate blocks (for example, blocks containing info on their work status, work completed, etc.) from the same latest block of the chain. For example, in cryptocurrency operations, one could not trust an orphan block, which is not part of the chain, to make transaction for another (or new) item or service.

Figure 7:
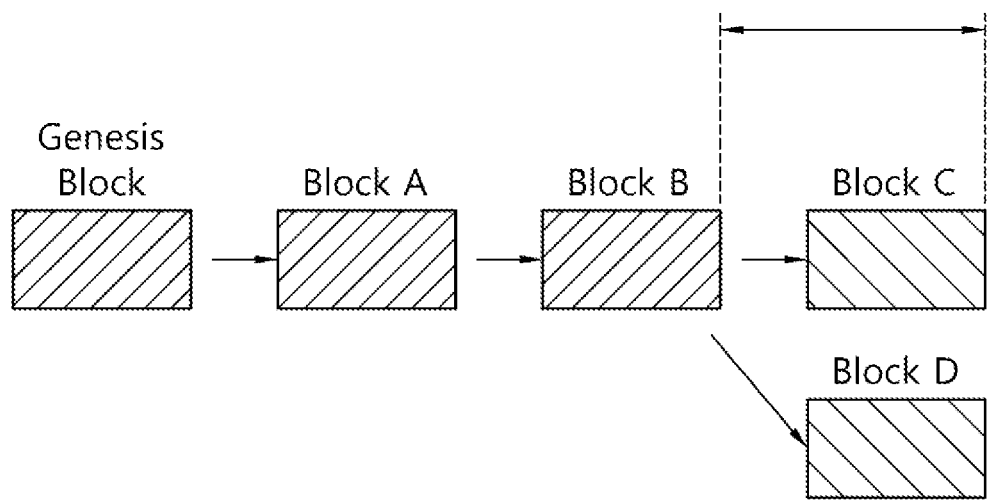
FIGS. 7 and 8 show an example of scenarios related to orphan blocks to which implementations of the present disclosure is applied.
Figure 8:
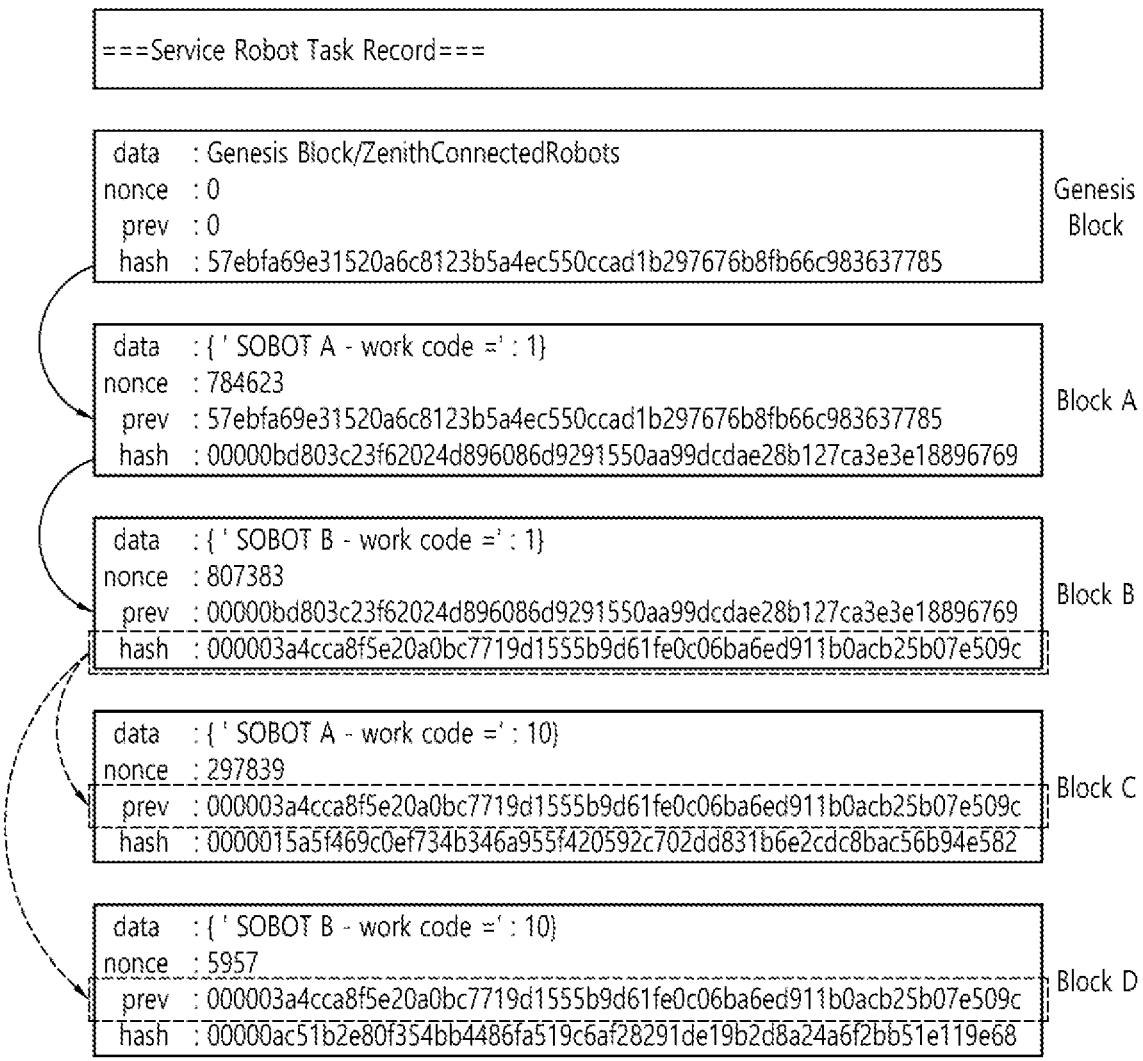

FIGS. 7 and 8 show an example of scenarios related to orphan blocks to which implementations of the present disclosure is applied.

Referring to FIG. 7, a blockchain may include a Genesis Block, Block A, and Block B. The Genesis Block may be the first block of the blockchain. Two miners may initiate to generate Block C and Block D, respectively, in a similar time.

For example, Block C may be logically attached to Block B of the blockchain validly. Then, Block D may become an orphan block.

Referring to FIG. 8, each block may include a 'data', a 'nonce', a 'previous block', and a 'hash'.

A data of each block may include an information to be stored for the blockchain. By attaching a new block to the blockchain, the miners could store new information to the blockchain.

A nonce is an abbreviation for "number only used once". The nonce may be a central part of the proof of work (PoW) mining algorithm for blockchains and cryptocurrencies, such as Bitcoin. Miners compete with each other to find a nonce that produces a hash with a value lower than or equal to that set by the network difficulty. If a miner finds such a nonce, called a golden nonce, then they win the right to add that block to the blockchain and receive the block reward.

The nonce may be a random, one-time, whole number. Miners test and discard millions of nonces every second. They are hoping to produce a hash value that meets the target and so win the block reward.

A block may include a cryptographic hash of a previous block. For example, the hash of the previous block may be simply described as 'prey'.

A block may include a cryptographic hash of the current block. A cryptographic hash function (CHF) is a mathematical algorithm that maps data of arbitrary size (often called the "message") to a bit array of a fixed size (the "hash value", "hash", or "message digest"). It is a one-way function, that is, a function which is practically infeasible to invert. Ideally, the only way to find a message that produces a given hash is to attempt a brute-force search of possible inputs to see if they produce a match, or use a rainbow table of matched hashes. Cryptographic hash functions are a basic tool of modern cryptography.

For example, in FIG. 8, the Genesis Block may include "Genesis Block/ZenithConnectedRobots" as a data, "0" as a nonce, "0" as a previous hash, and "57eb . . . 7785" as a current hash.

The Block A may include "{SOTOT A—work code=':1}" as a data, "784623" as a nonce, "57ebfa6 . . . 7785" as a previous hash, and "00000bd . . . 6769" as a current hash. It may be obvious that the previous hash of the Block A is same with the current hash of the Genesis Block.

The Block B may include "{SOTOT B—work code=':1}" as a data, "807383" as a nonce, "00000bd . . . 6769" as a previous hash, and "000003a . . . 509c" as a current hash. It may be obvious that the previous hash of the Block B is same with the current hash of the Block A.

The Block C may include "{SOTOT A—work code=': 10}" as a data, "297839" as a nonce, "000003a . . . 509c" as a previous hash, and "0000015 . . . e582" as a current hash.

The Block D may include "{SOTOT B—work code=': 10}" as a data, "5957" as a nonce, "000003a . . . 509c" as a previous hash, and "00000ac 9e68" as a current hash.

The previous hash of the Block C and the Block D may be same with the current hash of the Block A. In other words, two different minders may initiate to generate the Block C and the Block D in similar time, respectively. For example, Block C may be logically attached to Block B of the blockchain validly. Then, Block D may become an orphan block.

As described above, the orphan block could be generated for a blockchain. Since the orphan block is not attached to the blockchain, lots of resources for generating the orphan block could be wasted. If the orphan blocks are reused in the blockchain, the resources could be saved.

Figure 9:
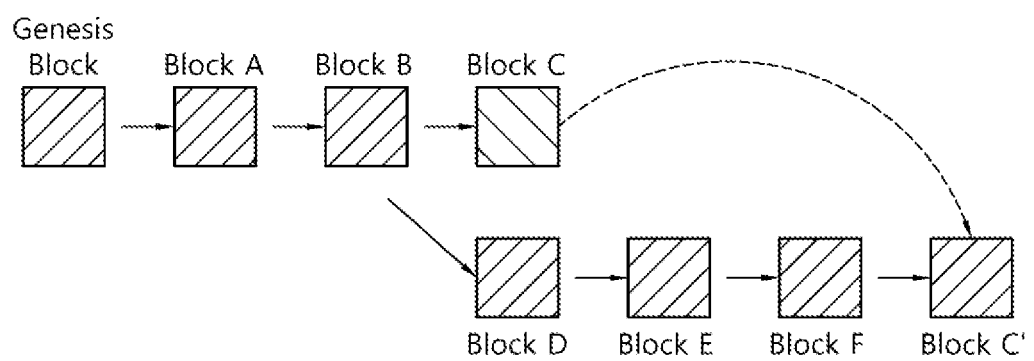
FIG. 9 shows an example of method for reusing the orphan blocks to which implementations of the present disclosure is applied.

FIG. 9 shows an example of method for reusing the orphan blocks to which implementations of the present disclosure is applied.

In FIG. 9, a blockchain may include a Genesis Block, a Block A, a Block B, a Block D, a Block E, a Block F.

A Block C may not be logically attached to the Block B validly and become an orphan block.

In this example, the Block C may be reused for the blockchain by attaching to the Block F. That is, the Block C may be changed to the Block C' and be logically attached to the Block F. For example, Block C' may include a new nonce and a new previous hash.

Figure 10:
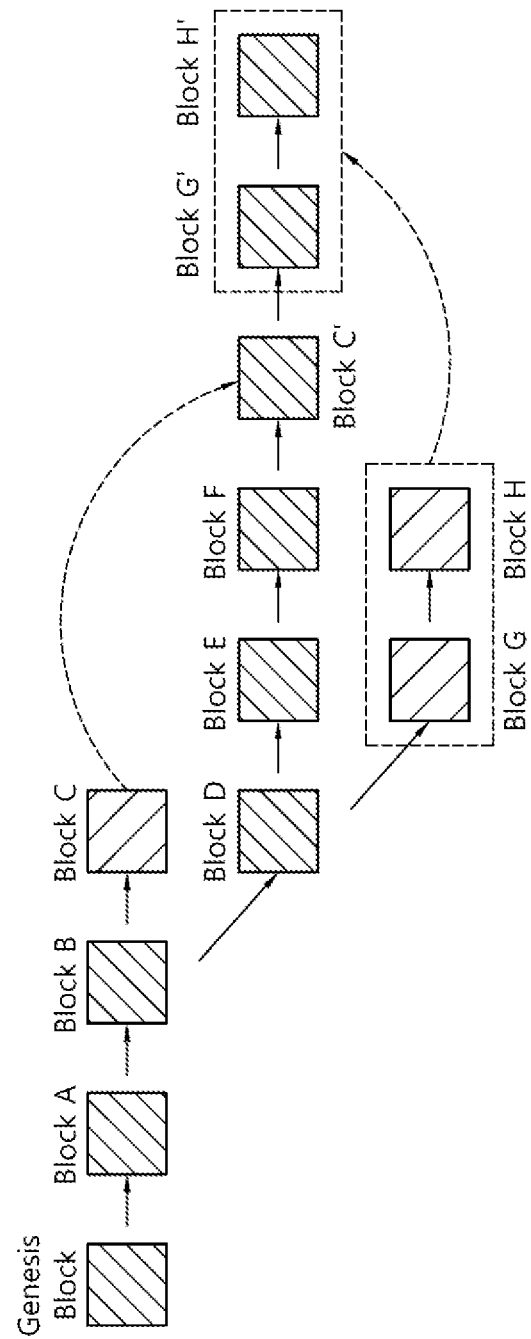
FIG. 10 shows an example of method for reusing the orphan blocks to which implementations of the present disclosure is applied.

FIG. 10 shows an example of method for reusing the orphan blocks to which implementations of the present disclosure is applied.

In FIG. 10, a blockchain may include a Genesis Block, a Block A, a Block B, a Block D, a Block E, a Block F.

A Block C may not be logically attached to the Block B validly and become an orphan block. Then, the Block C may be reused as a Block C' by being attached to the Block F.

In this example, a Block G and a Block H may become orphan blocks, since the Block G is not attached to the Block D validly.

Although the Block H is attached to the Block G validly, the Block H become an orphan block, because the Block G is not a part of the blockchain.

Then, the Block G and the Block H may be reused as a Block H' and a Block G' by being attached to the Block C'.

Figure 11:
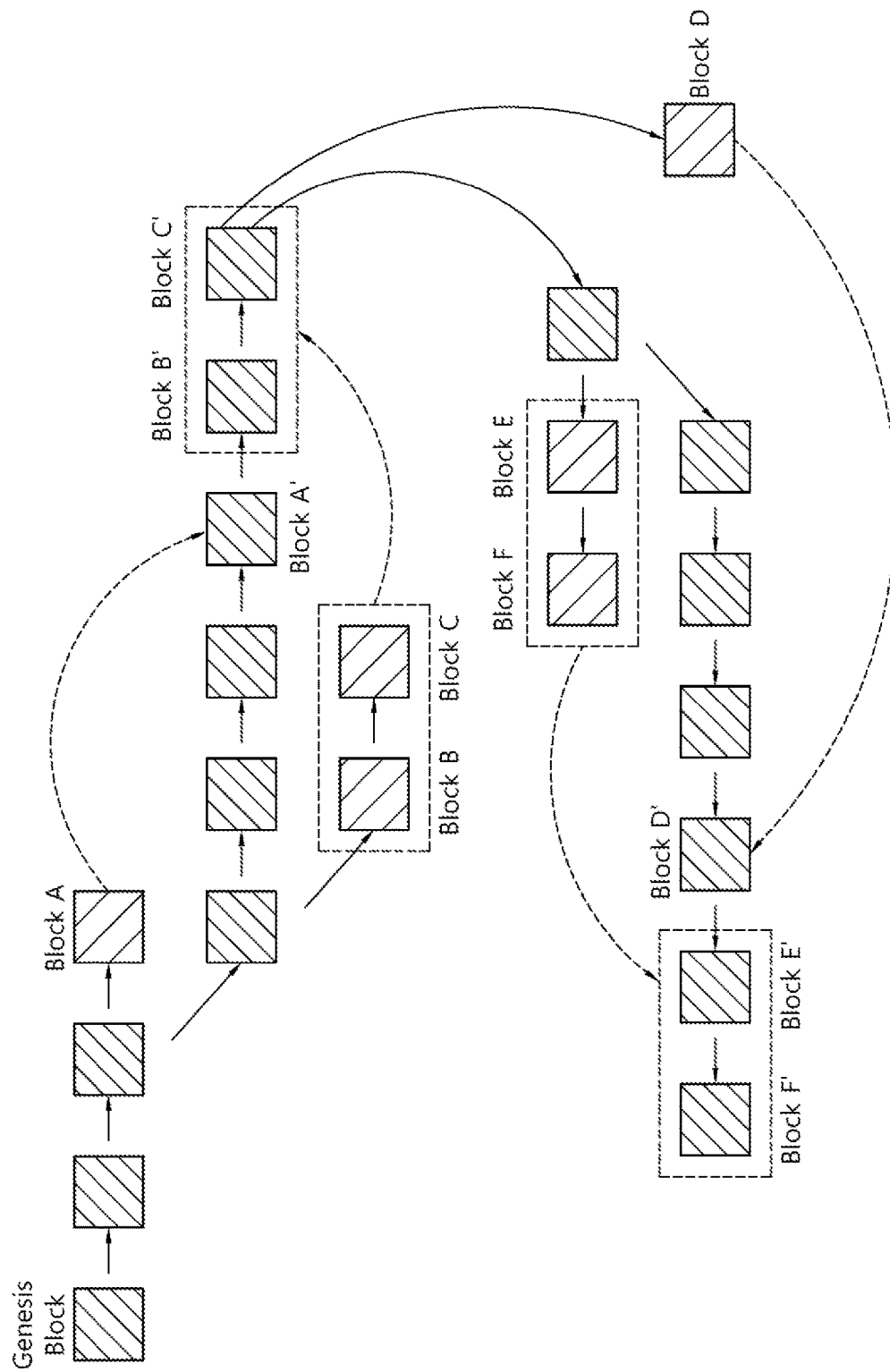
FIG. 11 shows an example of method for reusing the orphan blocks to which implementations of the present disclosure is applied.

FIG. 11 shows an example of method for reusing the orphan blocks to which implementations of the present disclosure is applied.

In FIG. 11, a Block A, a Block B, a Block C, a Block D, a Block E, and a Block F may become orphan blocks. Then, these orphan blocks may be reused by attaching the blockchain.

For example, a Block A', a Block B', a Block C', a Block D', a Block E', and a Block F' may become a part of the blockchain.

Referring to FIGS. 9 to 11, a block in the blockchain may not be generated in a chronological order. For example, the reused block (for example, a Block A' in FIG. 11) may be generated earlier than a last block of the blockchain where the orphan block is attached.

In a real-time or semi-real-time service operation, orphan block may cause degradation for service operation. For example, lots of resources (for example, time and computing power) may be required to reuse orphan blocks.

Therefore, studies for reducing orphan blocks for a blockchain are needed.

Hereinafter, a method for reducing orphan blocks for a blockchain, according to some embodiments of the present disclosure, will be described with reference to the following drawings.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings. Herein, a wireless device may be referred to as a user equipment (UE) or a robot.

Figure 12:
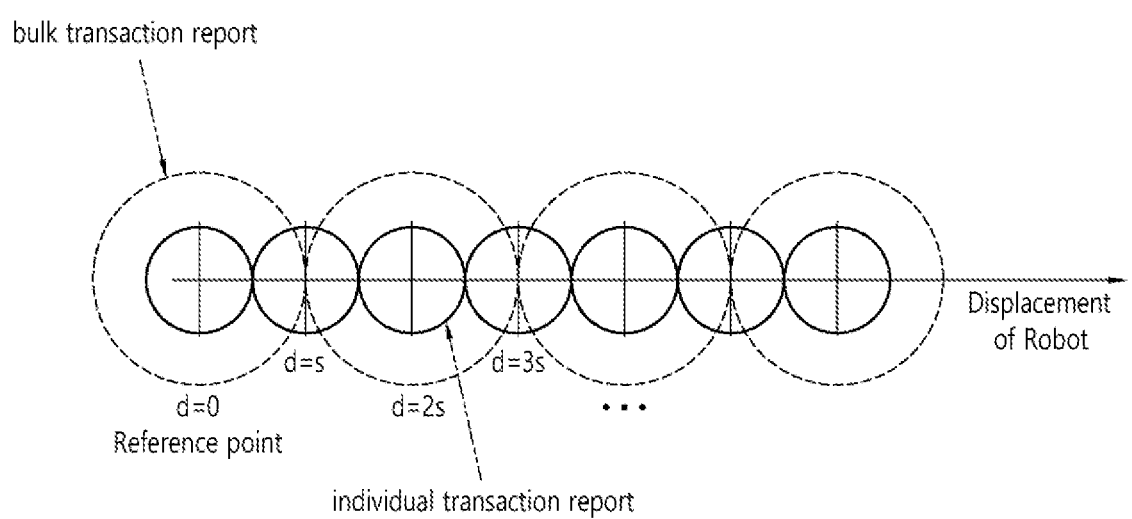
FIGS. 12 and 13 show an example of a method for reducing likelihood that a block becomes an orphan block for a blockchain, according to some embodiments of the present disclosure.
Figure 13:
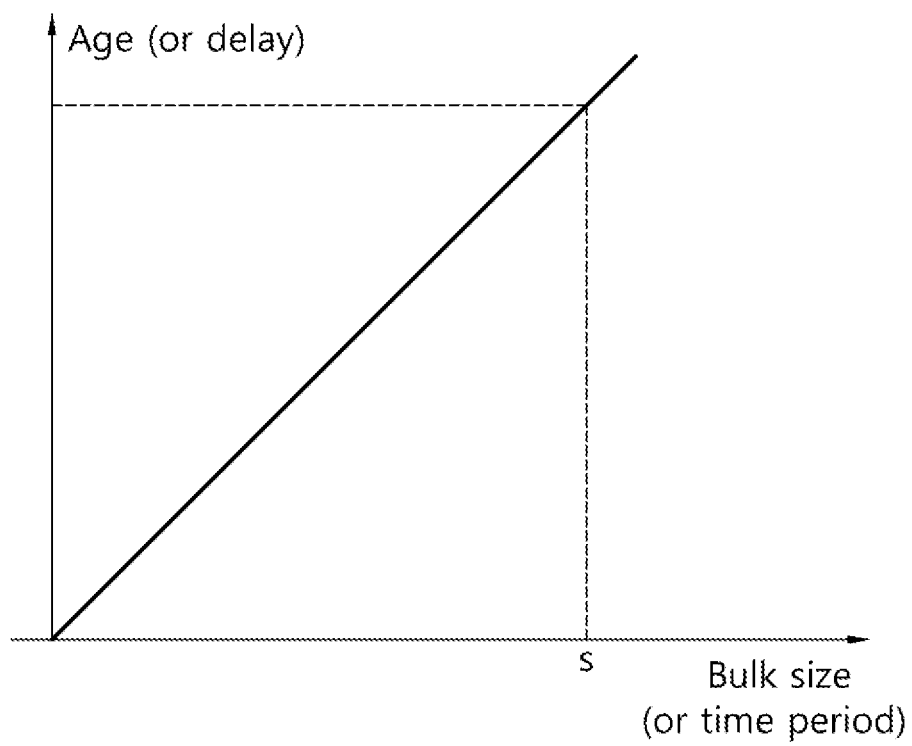

FIGS. 12 and 13 show an example of a method for reducing likelihood that a block becomes an orphan block for a blockchain, according to some embodiments of the present disclosure.

If target (for example, a block) is set low, it may be more difficult to generate the block. Then, the block generation rate may be lower. In this case, orphan block generation rate could be decreasing.

This mechanism may be suggested to lower the orphan block generation rate. For example, a device could use Bulk Transaction Report instead of making one for individual transaction. For example, a device could perform Bulk Transaction reporting over an application layer.

Referring to FIG. 12, a robot may move from a reference point. A robot may perform transaction reporting based on the displacement from the reference point.

For example, a robot may perform individual transaction reporting. In this case, a robot may perform transaction reporting, when the displacement of the robot (for example, "d" in FIG. 12) is 0,s, 2s, 3s, n*s (for example, n is a natural number).

For other example, a robot may perform bulk transaction reporting. In this case, a robot may perform transaction reporting, when the displacement of the robot (for example, "d" in FIG. 12) is 0, 2s, 4s, 2n*s.

That is, a robot could perform Bulk Transaction Reporting, instead of making one for individual transaction, so that the delay for generating a new block becomes greater.

Referring to FIG. 13, age (or delay) for a new block becomes greater as the bulk size (or time period) of the new block becomes bigger.

In other words, when a robot uses the bulk transaction reporting, the variance of delay for a new block will grow bigger. Since the variance of delay for a new block glows, it may reduce the ratio of orphan blocks.

According to some embodiments of the present disclosure, a distributed method may be used for Bulk Transaction Reporting.

If a participating robot observes an orphan block generation ratio greater than a predetermined threshold value, the robot may increase the batch size by a pre-determined number (for example, 1, 2, or 3).

According to some embodiments of the present disclosure, centralized geo-specific method may be used for Bulk Transaction Reporting.

An agent (for example, a server connected to a network entity) may monitor the orphan block generation ratio in a certain geographical area (for example, the area can be determined based on a cell or a zip code).

If the monitored ratio is greater than a certain threshold value, the agent may update the batch size and inform the updated value to 3 gpp network entity, so that the updated value (or the updated batch size) could be transmitted (for example, via broadcast, multicast, and/or unicast manner) to those participating robots (for example, blockchain members) residing in the particular area.

When the robots in the particular area received the updated value or the updated batch size, the robots may perform the bulk transaction reporting using the updated value or the updated batch size.

In other words, the agent could control whether the robots in a particular area performs the bulk transaction reporting or the individual transaction reporting.

Figure 14:
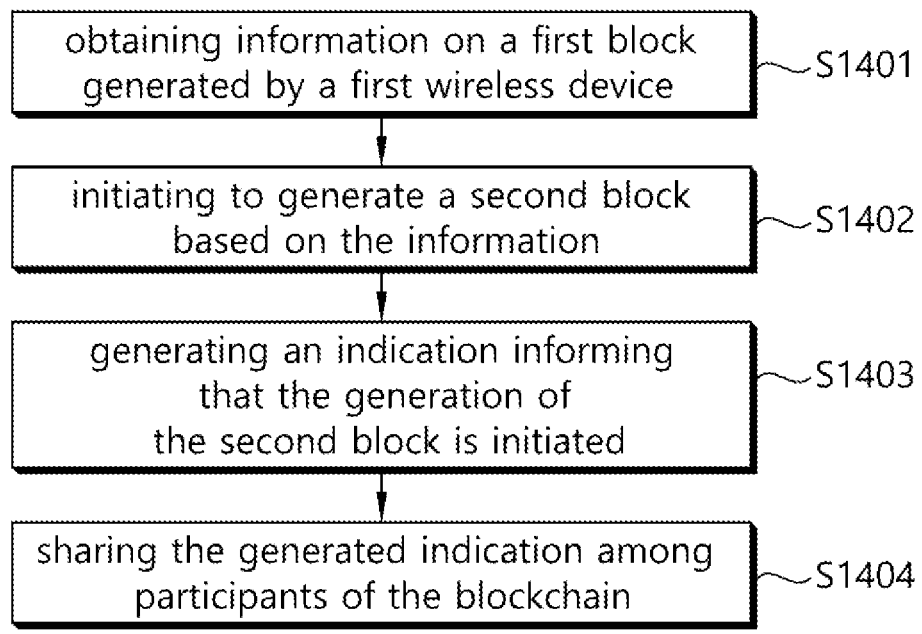
FIG. 14 shows an example of a method for reducing orphan blocks for a blockchain, according to some embodiments of the present disclosure.

FIG. 14 shows an example of a method for reducing orphan blocks for a blockchain, according to some embodiments of the present disclosure.

In particular, FIG. 14 describes a method performed by a second wireless device. For example, there are a first wireless device, a second wireless device, and a third wireless device in a multi-devices system.

In step S1401, a second wireless device may obtain information on a first block generated by a first wireless device. The first block may be a last block of a blockchain.

For example, the information on the first block may include a hash of the first block.

The second wireless device may transmit, to the first wireless device, a request for the information of the first block. The second wireless device may receive, from the first wireless device, a response including the information of the first block.

Otherwise, if the first block is already occupied by another block, the second wireless device may receive, from the first wireless device, a response informing that the first block is already preoccupied by the another block. In this case, the response may not include the information of the first block.

In step S1402, a second wireless device may initiate to generate a second block based on the information.

For example, the second wireless device may store the information on the first block in the second block. For example, the second wireless device may include a hash of the first block in a previous hash of the second block.

In step S1403, a second wireless device may generate an indication informing that the generation of the second block is initiated.

For example, the second block is to be logically attached to the first block to join the blockchain.

In step S1404, a second wireless device may share the generated indication among participants of the blockchain.

According to some embodiments of the present disclosure, the sharing the generated indication may include transmitting, to a third wireless device, the generated indication.

In other words, the second wireless device may transmit, to a third wireless device, the generated indication.

For example, the third wireless device may be another robot, different from the second wireless device, included in a same multi-devices system with the first wireless device and the second wireless device.

For example, the indication, generated by the second wireless device, may inform that another block, other than the second block, could not be logically attached to the first block to join the blockchain.

When the third wireless device receives the indication, the third wireless device may not initiate a third block to be logically attached to the first block to join the blockchain. For example, the third wireless device may stop to generate the third block.

For example, the second wireless device may transmits, to the third wireless device, a time information for the generation of the second block. For example, the time information and the indication, generated in step S1403, may be included in a single message. For example, the time information may be included in the indication, generated in step S1403.

When the third wireless device receives the time information, the third wireless device may wait to generate a third block until the generation of the second block is complete, based on the received time information.

Then, the third wireless device may generate the third block after generation of the second block, and attach the third block to the second block.

According to some embodiments of the present disclosure, the sharing the generated indication may include transmitting, to a third wireless device, the generated indication.

In other words, a second wireless device may transmit, to the first wireless device, the generated indication.

For example, the indication, generated in step S1403, may inform that the first block is preoccupied as a parent block of the second block.

For example, a block of a blockchain may include a hyper layer related to information of a next block. For example, the first block may also include a hyper layer related to information of a next block. For example, the information related to the next block may include a hash of the next block. In other words, the hyper layer may include a hash of the next block.

For example, when the first wireless receives, from the second wireless device, the indication generated in the step S1403, the first wireless device may store the information of the second block in the hyper layer of the first block. For example, upon receiving the indication, the first wireless device may store the hash of the second block in the 'next hash' of the hyper layer.

When the 'next hash' of the first block is filled with the hash of the second block, the first block may announce other devices that the first block is already preoccupied as a parent block of the second block. For example, the first block may inform the third wireless device that the first block is already occupied, when the third wireless device attempts to obtain the information on the first block. For example, For example, the first block may transmit, to the third wireless device, a message informing that the first block is already occupied, when the third wireless requests the hash of the first block.

According to some embodiments of the present disclosure, the second wireless device may be in communication with at least one of a user equipment, a network, or an autonomous vehicle other than the wireless device. For example, the second wireless device may be in communication with the first wireless device and/or the third wireless device by using a communication layer.

Figure 15:
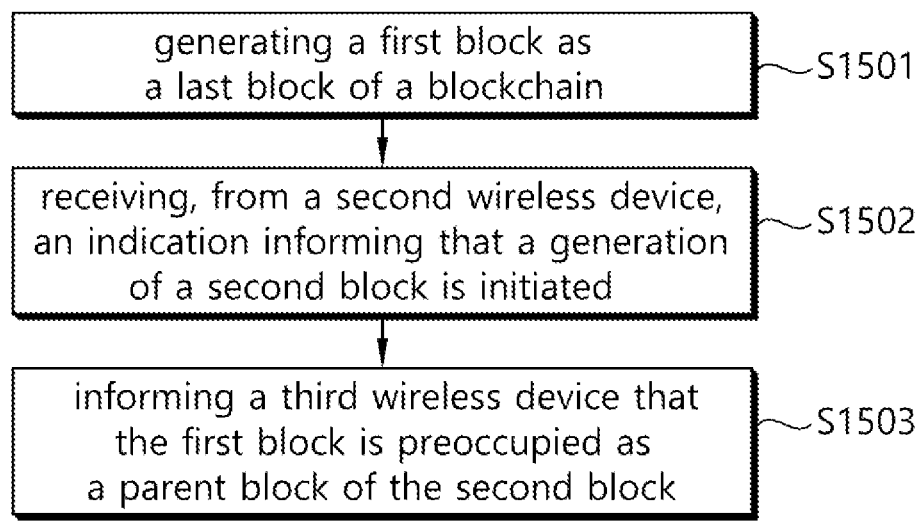
FIG. 15 shows an example of a method for reducing orphan blocks for a blockchain, according to some embodiments of the present disclosure.

FIG. 15 shows an example of a method for reducing orphan blocks for a blockchain, according to some embodiments of the present disclosure.

In particular, FIG. 15 describes a method performed by a first wireless device. For example, there are a first wireless device, a second wireless device, and a third wireless device in a multi-devices system.

In step S1501, a first wireless device may generate a first block as a last block of a blockchain.

For example, the first block may include a hyper layer related to information of a next block. For example, the hyper layer may include a hash of the next block.

In step S1502, a first wireless device may receive, from a second wireless device, an indication informing that a generation of a second block is initiated. The second block may be logically attached to the first block.

For example, the first wireless device may store information of the second block in the hyper layer upon receiving the indication from the second wireless device. For example, the stored information of the second block may include a hash of the second block. In other words, the first wireless device may write the hash of the second block for in 'next hash' of the first block.

In step S1503, a first wireless device may inform a third wireless device that the first block is preoccupied as a parent block of the second block.

For example, when the third wireless device is informed that the first block is preoccupied, the third wireless device may stop to generate a third block to be logically attached to the first block.

For example, a first wireless device may inform the third wireless device (or other wireless devices in the multi-devices system) that the first block is preoccupied, upon receiving the indication from the second wireless device.

For example, a first wireless device may inform the third wireless device (or another wireless device in the multi-devices system) that the first block is preoccupied, when the third wireless device request a hash of the first block.

Figure 16:
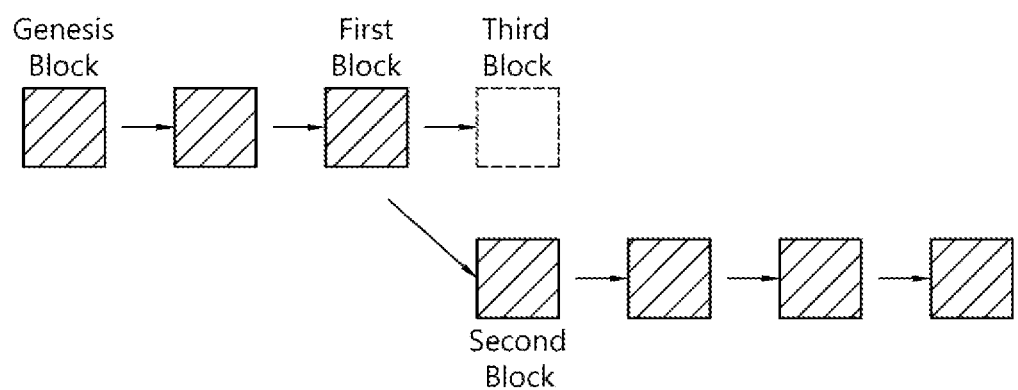
FIG. 16 shows an example of a method for reducing orphan blocks for a blockchain, according to some embodiments of the present disclosure.

FIG. 16 shows an example of a method for reducing orphan blocks for a blockchain, according to some embodiments of the present disclosure.

In FIG. 16, a blockchain may include a genesis block and a first block. The second block may be logically attached to the first block. The third block may be referred to as an orphan block, which could be generated.

In this example, it may be assumed that a first block is generated by a first wireless device, a second block is generated by a second wireless device, and the third block is generated by a third wireless device. For example, the first wireless device, the second wireless device, and the third wireless device may be different each other. For other example, the first wireless device and the third wireless device may be a same wireless device, which is different from the second wireless device. For other example the first wireless device and the second wireless device may be a same wireless device, which is different from the third wireless device.

The second wireless device may generate a second block as a part of the blockchain. Upon the second initiate to generate the second block, the second wireless device may generate an indication informing that the generation of the second block is initiated. The second block may transmit the generated second block to the first wireless device and the third wireless device.

When the first wireless device receives the indication from the second wireless device, the first wireless device may fill a hyper-layer of the first block with information of the second block.

For example, upon the first block is preoccupied as a parent block of the second block, the first wireless device may inform other wireless devices (for example, the third wireless device) that the first block has been preoccupied.

For other example, the first block may inform that the first block has been occupied, when another wireless device attempts to obtain the information of the first block (for example, a hash of the first block).

Therefore, if the first wireless device stores a hash of the second block into "a next block" included in the first block, other blocks could not be logically attached to the first block.

According to some embodiments of the present disclosure, a wireless device (for example, a robot) may perform a pre-announcement for reducing orphan block generation rate. For example, once mining is begun by a wireless device, the wireless device may announce it to the blockchain participating members. For example, a wireless device may announce that the wireless device begins to mine by using communication layer.

If a participating wireless device (for example, a first robot) has begun mining, the robot (as a participating blockchain member) may announce to indicate its ongoing work (for example, proof-of-work).

If other participating wireless devices (for example, a second robot) receives the indication (or announcement), then the other wireless devices may wait until the first robot's work (or mining) is completed.

When the first robot's work is completed and that block is attached to the blockchain, the other robots, for example, second robot, may start mining (work) and announce to indicate.

According to some embodiments of the present disclosure, a wireless device may use a hyper-layer, which is another outer layer of reserved-direction blockchain. For example, a wireless device may use a hyper-layer to prevent an orphan block. A wireless device may use communication layer to apply the hyper-layer.

If a participating wireless device (for example, a robot) begins mining work (for example, proof-of-work), the wireless device may give an indication to the previous block that this wireless device may preoccupy the previous block, as a parent block of a new block. For example, the wireless device may announce the previous block that generation of the next block is initiated.

Figure 17:
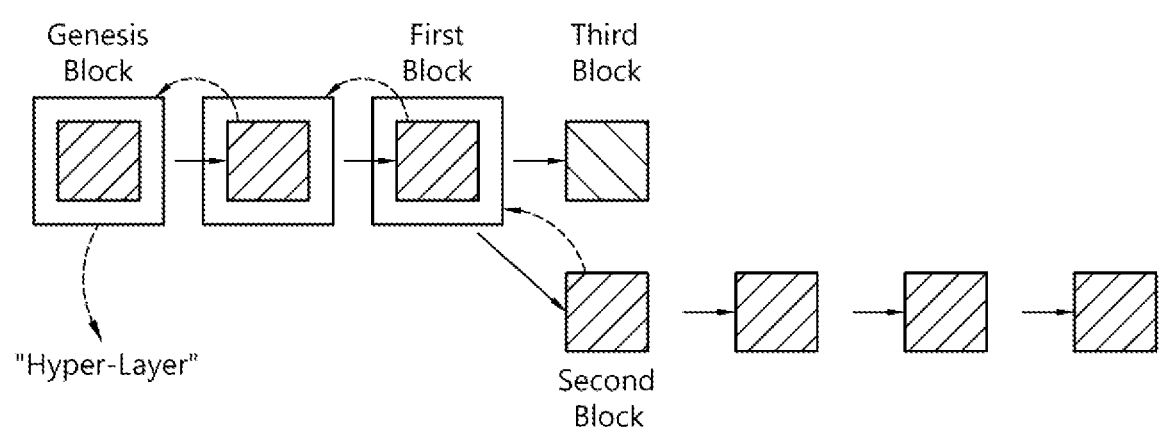

FIGS. 17 and 18 show an example of a method for reducing orphan blocks for a blockchain using a hyper-layer, according to some embodiments of the present disclosure. The detailed description overlapping with the above-described contents (for example, FIG. 8) could be simplified or omitted.

Referring to FIG. 17, a second wireless device may initiate to generate the second block. Then, the second wireless device may inform a first wireless device (which generates the first block) that the second wireless device initiates to generate to a second block to be logically attached to the first block. Then, the first wireless device may mark in the first block that the next block following the first block is second block. For example, the first block may include a next hash of the second block.

In other words, miner of the second block may be ahead of the miner of the first block in that miner of the second block pre-announced that the previous block is a parent block of the second block. Then, the first block could not be a parent block of another block, for example the third block.

That is, the second block may announce the first block that the second block is in child-ship with the first block.

Referring to FIG. 18, a block in a blockchain may include a data, a nonce, a previous hash, a current hash, and a next hash.

For example, a genesis block may include a next hash of a block A.

For example, a block A may include a next hash of a first block. For example, a first block may be generated by a first wireless device.

For example, when a second wireless device initiate to generate the second block, the second wireless device may inform the first wireless device that the generation of the second block is initiated. Then, the first wireless device may fill the next hash with the hash of the second block.

For other example, when a second wireless device initiate to generate the second block, the second wireless device may inform the first wireless device that the first block is pre-occupied by the second block. Then, the first wireless device may fill the next hash of the first block with the hash of the second block.

In this case, the third wireless device may not able to attach the third block to the first block, since the hyper-layer or the next hash of the first block is already occupied. Then, the third wireless device may not generate the third block to be logically attached to the first block. The third wireless device may wait the generation of the second block. Therefore, the generation of an orphan block could be prevented.

Hereinafter, an apparatus for reducing orphan blocks for a blockchain, according to some embodiments of the present disclosure, will be described. Herein, the apparatus may be a wireless device (100 or 200) in FIGS. 2, 3, and 4.

For example, a first wireless device and a second wireless device may perform methods described above. The detailed description overlapping with the above-described contents could be simplified or omitted.

Referring to FIG. 2, a first wireless device 100 may include a processor 102, a memory 104, and a transceiver 106. The processor 102 may be configured to be coupled operably with the memory 104 and the transceiver 106.

In addition, a second wireless device 200 may include a processor 202, a memory 204, and a transceiver 206. The processor 202 may be configured to be coupled operably with the memory 204 and the transceiver 206.

According to some embodiments of the present disclosure, a second wireless device 200 may perform a method for reducing orphan blocks for a blockchain.

The processor 202 may be configured to obtain information on a first block generated by a first wireless device. The first block may be a last block of a blockchain. The processor 202 may be configured to initiate to generate a second block based on the information. The second block may be to be logically attached to the first block to join the blockchain. The processor 202 may be configured to generate an indication informing that a generation of the second block is initiated. The processor 202 may be configured to share the generated indication among participants of the blockchain.

According to some embodiments of the present disclosure, the processor 202 may be configured to control the transceiver 206 to transmit, to a third wireless device, the generated indication.

For example, the indication may inform that another block, other than the second block, could not be logically attached to the first block.

For example, the processor 202 may be configured to control the transceiver 206 to transmit, to the third wireless device, a time information for the generation of the second block.

For example, the information on the first block includes a hash of the first block.

According to some embodiments of the present disclosure, the processor 202 may be configured to control the transceiver 206 to transmit, to the first wireless device, the generated indication.

For example, the indication may inform that the first block is preoccupied as a parent block of the second block.

For example, the first block may include a hyper layer related to information of a next block.

For example, the hyper layer may include a hash of the next block.

According to some embodiments of the present disclosure, the processor 202 may be configured to be in communication with at least one of a user equipment, a network, or an autonomous vehicle other than the wireless device.

According to some embodiments of the present disclosure, a first wireless device 100 may perform a method for reducing orphan blocks for a blockchain.

The processor 102 may be configured to generate a first block as a last block of a blockchain. The processor 102 may be configured to receive, from a second wireless device, an indication informing that a generation of a second block is initiated. The second block may be to be logically attached to the first block to join the blockchain. The processor 102 may be configured to inform a third wireless device that the first block is preoccupied as a parent block of the second block.

For example, the first block may include a hyper layer related to information of a next block.

For example, the processor 102 may be configured to store information of the second block in the hyper layer upon receiving the indication from the second wireless device.

For example, the stored information of the second block includes a hash of the second block.

According to some embodiments of the present disclosure, the processor 102 may be configured to be in communication with at least one of a user equipment, a network, or an autonomous vehicle other than the wireless device.

Hereinafter, a processor for a second wireless device for reducing orphan blocks for a blockchain, according to some embodiments of the present disclosure, will be described.

The processor may be configured to control the second wireless device to obtain information on a first block generated by a first wireless device. The first block may be a last block of a blockchain. The processor may be configured to control the second wireless device to initiate to generate a second block based on the information. The second block may be to be logically attached to the first block to join the blockchain. The processor may be configured to control the second wireless device to generate an indication informing that a generation of the second block is initiated. The processor may be configured to control the second wireless device to share the generated indication among participants of the blockchain.

According to some embodiments of the present disclosure, the processor may be configured to control the second wireless device to transmit, to a third wireless device, the generated indication.

For example, the indication may inform that another block, other than the second block, could not be logically attached to the first block.

For example, the processor may be configured to control the second wireless device to transmit, to the third wireless device, a time information for the generation of the second block.

For example, the information on the first block includes a hash of the first block.

According to some embodiments of the present disclosure, the processor may be configured to control the second wireless device to transmit, to the first wireless device, the generated indication.

For example, the indication may inform that the first block is preoccupied as a parent block of the second block.

For example, the first block may include a hyper layer related to information of a next block.

For example, the hyper layer may include a hash of the next block.

According to some embodiments of the present disclosure, the processor may be configured to control the second wireless device to be in communication with at least one of a user equipment, a network, or an autonomous vehicle other than the wireless device.

Hereinafter, a processor for a first wireless device for reducing orphan blocks for a blockchain, according to some embodiments of the present disclosure, will be described.

The processor may be configured to control the first wireless device to generate a first block as a last block of a blockchain. The processor may be configured to control the first wireless device to receive, from a second wireless device, an indication informing that a generation of a second block is initiated. The second block may be to be logically attached to the first block to join the blockchain. The processor may be configured to control the first wireless device to inform a third wireless device that the first block is preoccupied as a parent block of the second block.

For example, the first block may include a hyper layer related to information of a next block.

For example, the processor may be configured to control the first wireless device to store information of the second block in the hyper layer upon receiving the indication from the second wireless device.

For example, the stored information of the second block includes a hash of the second block.

According to some embodiments of the present disclosure, the processor may be configured to control the first wireless device to be in communication with at least one of a user equipment, a network, or an autonomous vehicle other than the wireless device.

Hereinafter, a non-transitory computer-readable medium has stored thereon a plurality of instructions for autonomous changing for reducing orphan blocks for a blockchain, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a second wireless device.

The stored a plurality of instructions may cause the second wireless device to obtain information on a first block generated by a first wireless device. The first block may be a last block of a blockchain. The stored a plurality of instructions may cause the second wireless device to initiate to generate a second block based on the information. The second block may be to be logically attached to the first block to join the blockchain. The stored a plurality of instructions may cause the second wireless device to generate an indication informing that a generation of the second block is initiated. The stored a plurality of instructions may cause the second wireless device to share the generated indication among participants of the blockchain.

According to some embodiments of the present disclosure, the stored a plurality of instructions may cause the second wireless device to transmit, to a third wireless device, the generated indication.

For example, the indication may inform that another block, other than the second block, could not be logically attached to the first block.

For example, the stored a plurality of instructions may cause the second wireless device to transmit, to the third wireless device, a time information for the generation of the second block.

For example, the information on the first block includes a hash of the first block.

According to some embodiments of the present disclosure, the stored a plurality of instructions may cause the second wireless device to transmit, to the first wireless device, the generated indication.

For example, the indication may inform that the first block is preoccupied as a parent block of the second block.

For example, the first block may include a hyper layer related to information of a next block.

For example, the hyper layer may include a hash of the next block.

According to some embodiments of the present disclosure, the stored a plurality of instructions may cause the second wireless device to be in communication with at least one of a user equipment, a network, or an autonomous vehicle other than the wireless device.

According to some embodiment of the present disclosure, a non-transitory computer-readable medium has stored thereon a plurality of instructions. The stored a plurality of instructions may be executed by a processor of a first wireless device.

The stored a plurality of instructions may cause the first wireless device to generate a first block as a last block of a blockchain. The stored a plurality of instructions may cause the first wireless device to receive, from a second wireless device, an indication informing that a generation of a second block is initiated. The second block may be to be logically attached to the first block to join the blockchain. The stored a plurality of instructions may cause the first wireless device to inform a third wireless device that the first block is preoccupied as a parent block of the second block.

For example, the first block may include a hyper layer related to information of a next block.

For example, the stored a plurality of instructions may cause the first wireless device to store information of the second block in the hyper layer upon receiving the indication from the second wireless device.

For example, the stored information of the second block includes a hash of the second block.

According to some embodiments of the present disclosure, the stored a plurality of instructions may cause the first wireless device to be in communication with at least one of a user equipment, a network, or an autonomous vehicle other than the wireless device.

The present disclosure may have various advantageous effects.

According to some embodiments of the present disclosure, a device (for example, a wireless device) could efficiently reduce a number of orphan blocks for a blockchain.

For example, a device could efficiently reduce the orphan blocks by increasing batch size in a specific situation.

For example, a device could efficiently reduce the orphan blocks by informing other devices that a generation of a subsequent block for a block chain is initiated.

According to some embodiments of the present disclosure, a communication system could efficiently reduce a number of orphan blocks for a blockchain.

For example, a communication system could efficiently reduce the orphan blocks by controlling batch size to be generated.

Therefore, for use case scenarios that require real-time and/or semi-real-time information sharing (for example, work log and/or work status information sharing of service robots), it is possible to reduce the rate of orphan block generation, which is an inevitable obstacle, and reduce delay.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method comprising:
   obtaining, by a second wireless device, information on a first block of a blockchain generated by a first wireless device, wherein the first block is a last block of the blockchain;
   initiating, by the second wireless device, to generate a second block based on the information, wherein the second block is to be logically attached to the first block to join the blockchain;
   generating, by the second wireless device, an indication informing that a generation of the second block is initiated;
   sharing, by the second wireless device, the generated indication among participants of the blockchain; and
   transmitting, by the second wireless device to the first wireless device, the generated indication,
   wherein the generated indication further informs that the first block is preoccupied as a parent block of the second block.

2. The method of claim 1, further comprising:
   transmitting, by the second wireless device to a third wireless device, the generated indication.

3. The method of claim 2, wherein the generated indication informs that another block, other than the second block, could not be logically attached to the first block.

4. The method of claim 2, further comprising:
   transmitting, by the second wireless device to the third wireless device, time information for the generation of the second block.

5. The method of claim 1, wherein the information on the first block includes a hash of the first block.

6. The method of claim 1, wherein the first block includes a hyper layer related to information of a next block.

7. The method of claim 6, wherein the hyper layer includes a hash of the next block.

8. The method of claim 1, wherein the second wireless device is in communication with at least one of a user equipment, a network, or an autonomous vehicle other than the wireless device.

9. A method comprising:
   determining, by a first wireless device, that a first block of a blockchain is a last block of the blockchain, wherein the first block includes a hyper layer related to information of a next block;
   receiving, by the first wireless device from a second wireless device, an indication informing that a generation of a second block is initiated, wherein the second block is to be logically attached to the first block to join the blockchain as a new block;
   storing, by the first wireless device, information of the second block in the hyper layer upon receiving the generated indication from the second wireless device, wherein the stored information of the second block includes a hash of the second block; and
   informing, by the first wireless device, a third wireless device that the first block is preoccupied as a parent block of the second block.

10. A second wireless device comprising:
    a transceiver;
    a memory; and
    at least one processor operatively coupled to the transceiver and the memory, and configured to perform operations, the operations comprising:
    obtaining information on a first block of a blockchain generated by a first wireless device, wherein the first block is a last block of the blockchain;
    initiating to generate a second block based on the information, wherein the second block is to be logically attached to the first block to join the blockchain;
    generating an indication informing that a generation of the second block is initiated;
    sharing, by the second wireless device, the generated indication among participants of the blockchain; and
    transmitting, to the first wireless device, the generated indication,
    wherein the generated indication further informs that the first block is preoccupied as a parent block of the second block.

11. The second wireless device of claim 10, wherein the operations further comprise:
    transmitting, by the second wireless device to a third wireless device, the generated indication.

12. The second wireless device of claim 11, wherein the generated indication informs that another block, other than the second block, could not be logically attached to the first block.

13. The second wireless device of claim 11, wherein the operations further comprise:
    transmitting, to the third wireless device, time information for the generation of the second block.

14. The second wireless device of claim 10, wherein the information on the first block includes a hash of the first block.

* * * * *